United States Patent
Michael et al.

(10) Patent No.: US 6,281,474 B1
(45) Date of Patent: Aug. 28, 2001

(54) X-BEAM POSITIONER

(75) Inventors: Zane Allen Michael, Troy; Donald Joseph Metz, North Hampton; Daniel Warren Slanker, Huber Heights; Gary Daniel Schutte, Springfield, all of OH (US)

(73) Assignee: Motoman, Inc., Troy, OH (US)

( * ) Notice: Subject to any disclaimer, the term of this patent is extended or adjusted under 35 U.S.C. 154(b) by 0 days.

(21) Appl. No.: 09/641,188

(22) Filed: Aug. 17, 2000

Related U.S. Application Data
(60) Provisional application No. 60/150,199, filed on Aug. 17, 1999.

(51) Int. Cl.⁷ .................................................. B23K 26/12
(52) U.S. Cl. ................ 219/158; 219/121.82; 219/121.86
(58) Field of Search ............................... 219/158, 121.82, 219/121.86, 121.85, 121.6, 121.63; 74/608

(56) References Cited

U.S. PATENT DOCUMENTS

| | | | |
|---|---|---|---|
| 3,592,320 | * | 7/1971 | Binggeli . |
| 4,449,884 | * | 5/1984 | Motoda . |
| 4,666,363 | | 5/1987 | Johansson . |
| 5,074,741 | | 12/1991 | Johansson . |
| 5,249,663 | * | 10/1993 | McCoy et al. . |
| 5,647,724 | * | 7/1997 | Davis, Jr. et al. . |
| 5,658,476 | * | 8/1997 | Gullo et al. . |
| 5,873,569 | | 2/1999 | Boyd et al. . |
| 6,147,320 | * | 11/2000 | Bernecker et al. . |
| 6,147,323 | * | 11/2000 | Erickson et al. . |
| 6,158,941 | * | 12/2000 | Muka et al. . |

* cited by examiner

Primary Examiner—Tom Dunn
Assistant Examiner—Jonathan Johnson
(74) Attorney, Agent, or Firm—Killworth, Gottman, Hagan & Schaeff

(57) ABSTRACT

A workpiece positioner is provided including a positioner chassis, a specially designed rotary framework, and first and second sets of workpiece supports. In accordance with one embodiment of the present invention, a workpiece positioner is provided comprising a positioner chassis, a rotary framework, and first and second sets of workpiece supports. The rotary framework defines opposite rotary framework ends and is coupled to the positioner chassis so as to be rotatable about a longitudinal framework axis. The first set of workpiece supports is positioned on opposite ones of the rotary framework ends so as to define a first workpiece axis extending between the first set of workpiece supports. The second set of workpiece supports is positioned on opposite ones of the rotary framework ends so as to define a second workpiece axis extending between the second set of workpiece supports. The first workpiece axis and the second workpiece axis lie in a common workpiece plane. The rotary framework includes a crossing structure secured to the opposite rotary framework ends and extending along the longitudinal framework axis. The crossing structure comprises supportive sheet material. The supportive sheet material is arranged so as to be intersected by the common workpiece plane. A transverse cross section of the supportive sheet material converges in the direction of the common workpiece plane.

28 Claims, 7 Drawing Sheets

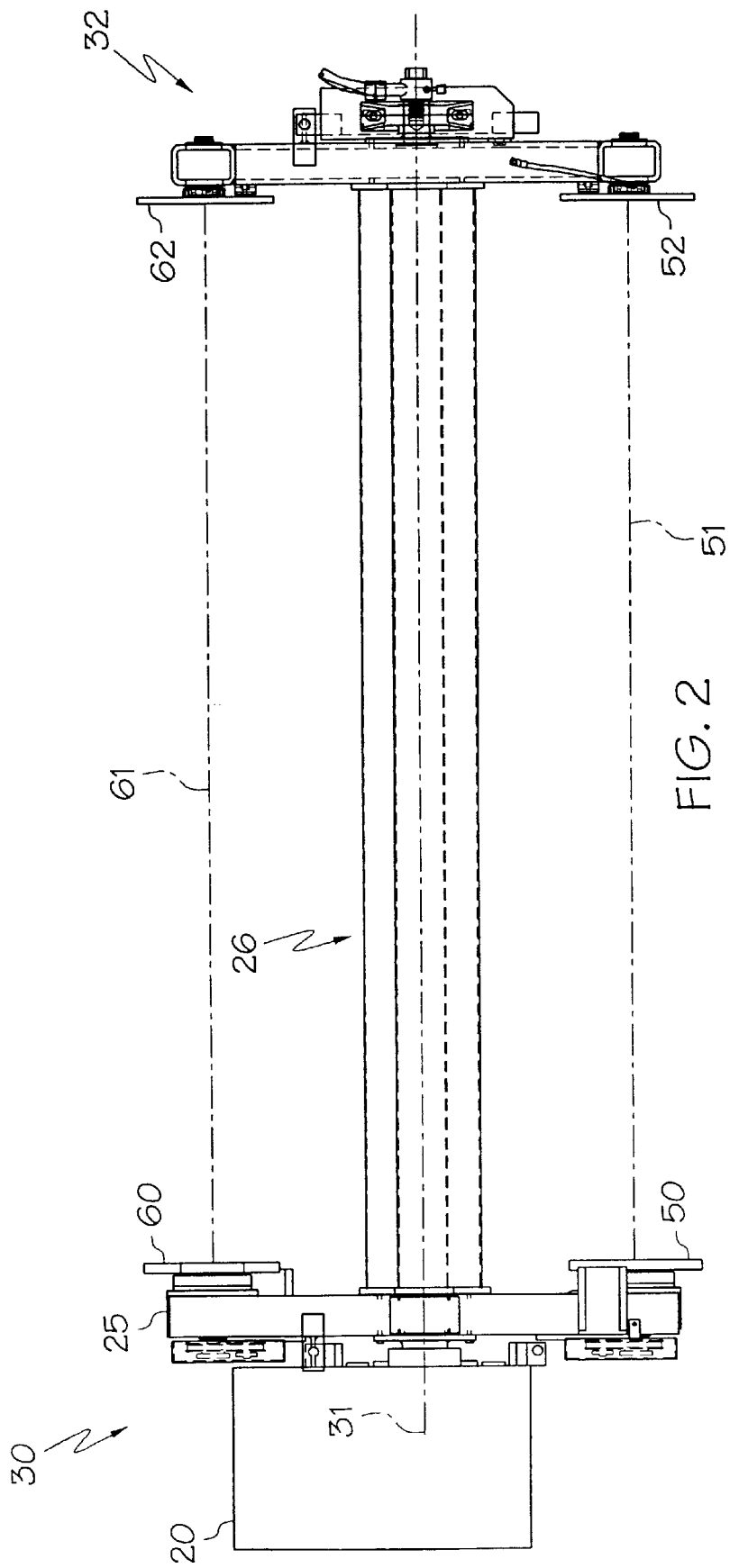

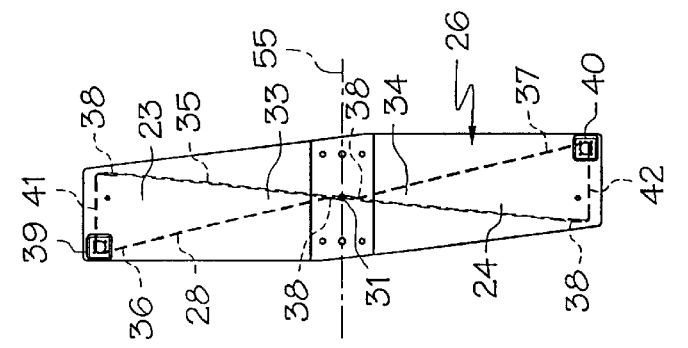
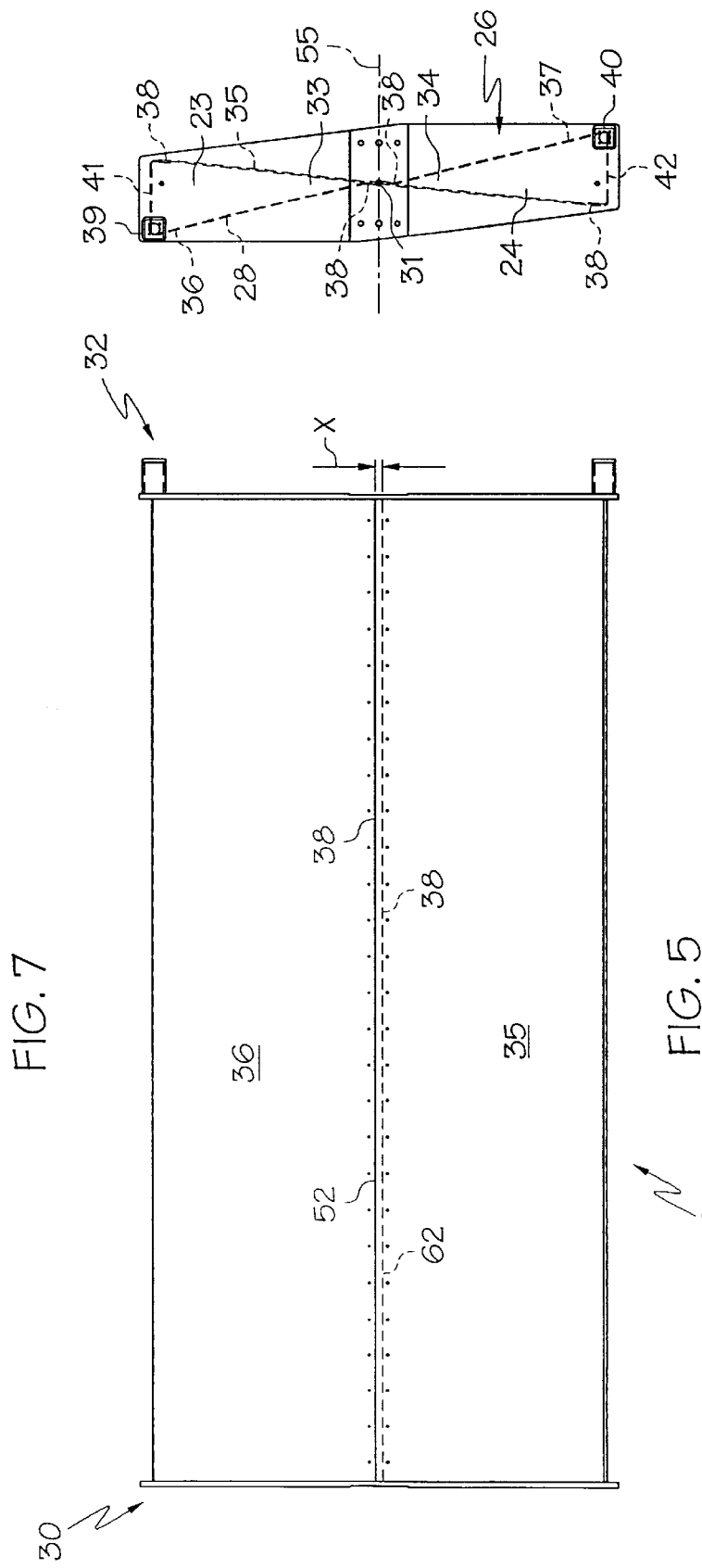
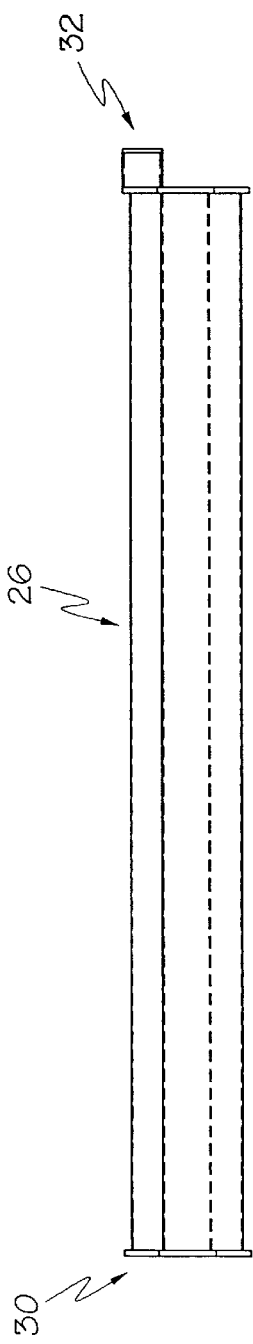

X-BEAM POSITIONER

CROSS-REFERENCE TO RELATED APPLICATIONS

This application claims the benefit of U.S. Provisional Application Ser. No. 60/150,199, X-BEAM POSITIONER, filed Aug. 17, 1999.

BACKGROUND AND SUMMARY OF THE INVENTION

The present invention relates to a workpiece manipulator or positioner. The positioner of the present invention may be utilized to position successive workpieces relative to an industrial robot for processing by the robot, or a tool held by the robot. The positioner is particularly well-suited for use in robotic workpiece laser processing, where there is a continuing drive to optimize the size of the envelope through which a workpiece may be rotated and a continuing need for a positioner of optimum structural stability.

This need is met by the present invention wherein a workpiece positioner is provided including a positioner chassis, a specially designed rotary framework, and first and second sets of workpiece supports. In accordance with one embodiment of the present invention, a workpiece positioner is provided comprising a positioner chassis, a rotary framework, and first and second sets of workpiece supports. The rotary framework defines opposite rotary framework ends and is coupled to the positioner chassis so as to be rotatable about a longitudinal framework axis. The first set of workpiece supports is positioned on opposite ones of the rotary framework ends so as to define a first workpiece axis extending between the first set of workpiece supports. The second set of workpiece supports is positioned on opposite ones of the rotary framework ends so as to define a second workpiece axis extending between the second set of workpiece supports. The first workpiece axis and the second workpiece axis lie in a common workpiece plane. The rotary framework includes a crossing structure secured to the opposite rotary framework ends and extending along the longitudinal framework axis. The crossing structure comprises supportive sheet material. The supportive sheet material is arranged so as to be intersected by the common workpiece plane. A transverse cross section of the supportive sheet material converges in the direction of the common workpiece plane.

The transverse cross section may include a first angle defining a first workpiece accommodating sector and the first workpiece axis may be arranged within the first workpiece accommodating sector along a projection bisecting the first angle. The transverse cross section may include a first angle defining a first workpiece accommodating sector and the first workpiece axis may be arranged within the first workpiece accommodating sector along a projection bisecting the first angle. The crossing structure may be arranged to function as an arc shield where workpieces supported between the first and second sets of workpiece supports are processed by arc welding robots.

In accordance with another embodiment of the present invention, a workpiece positioner is provided comprising a positioner chassis, a rotary framework, and first and second sets of workpiece supports. The rotary framework is coupled to the positioner chassis so as to be rotatable about a longitudinal framework axis. The rotary framework defines opposite rotary framework ends and includes a crossing structure secured to and extending between the opposite rotary framework ends. The crossing structure comprises supportive sheet material. The supportive sheet material defines an X-beam transverse cross section. The first set of workpiece supports is positioned on opposite ones of the rotary framework ends so as to define a first workpiece axis extending between the first set of workpiece supports. The second set of workpiece supports is positioned on opposite ones of the rotary framework ends so as to define a second workpiece axis extending between the second set of workpiece supports.

The supportive sheet material may include offset central apexes. The supportive sheet material may includes a primary supportive sheet and a pair of minor supportive sheets. The supportive sheet material may include a pair of elbow portions and respective arm extensions extending from the elbow portions. The transverse cross section may include first and second angles defining first and second workpiece accommodating sectors. The first workpiece axis may be arranged within the first workpiece accommodating sector along a projection bisecting the first angle. The second workpiece axis may be arranged within the second workpiece accommodating sector along a projection bisecting the second angle.

In accordance with yet another embodiment of the present invention, a workpiece positioner is provided comprising a positioner chassis, a rotary framework, and first and second sets of workpiece supports. The rotary framework is coupled to the positioner chassis so as to be rotatable about a longitudinal framework axis. The rotary framework defines opposite rotary framework ends and includes a crossing structure secured to and extending between the opposite rotary framework ends. The crossing structure comprises supportive sheet material. The supportive sheet material defines at least two intersecting supportive planes and a transverse cross section including at least one supportive apex. The first set of workpiece supports is positioned on opposite ones of the rotary framework ends so as to define a first workpiece axis extending between the first set of workpiece supports. The second set of workpiece supports is positioned on opposite ones of the rotary framework ends so as to define a second workpiece axis extending between the second set of workpiece supports.

The transverse cross section may include a first angle defining a first workpiece accommodating sector and the first workpiece axis may be arranged within the first workpiece accommodating sector along a projection bisecting the first angle. The transverse cross section may include a second angle defining a second workpiece accommodating sector and the second workpiece axis may be arranged within the second workpiece accommodating sector along a projection bisecting the second angle.

The intersecting supportive planes may be defined by a primary supportive sheet, a first minor supportive sheet, and a second minor supportive sheet. The primary supportive sheet may be disposed between the first and second workpiece axes such that a first side of the primary supportive sheet faces the first workpiece axis and a second side of the primary supportive sheet faces the second workpiece axis. The first minor supportive sheet may be mechanically coupled to the first side of the primary supportive sheet along a first coupling line parallel to the first workpiece axis. The second minor supportive sheet is mechanically coupled to the second side of the primary supportive sheet along a second coupling line parallel to the second workpiece axis. The first and second coupling lines are displaced from each other along a diametrical dimension of the primary supportive sheet.

The first minor supportive sheet may include an elbow portion and an arm extension. The arm extension may be mechanically coupled to the first side of the primary supportive sheet so as to form a first triangular cross sectional portion of the crossing structure. The second minor supportive sheet may also include an elbow portion and an arm extension. The arm extension may be mechanically coupled to the second side of the primary supportive sheet so as to form a second triangular cross sectional portion of the crossing structure.

The supportive sheet material may includes a pair of elbow portions, respective arm extensions extending from the elbow portions, and a substantially planar portion defined between the pair of elbow portions. Each of the arm extensions may define a plane intersecting a plane defined by the substantially planar portion. The intersecting supportive planes may be defined by a primary supportive sheet, a first minor supportive sheet, and a second minor supportive sheet. The primary supportive sheet may be disposed between the first and second workpiece axes such that a first side of the primary supportive sheet faces the first workpiece axis and a second side of the primary supportive sheet faces the second workpiece axis. The supportive sheet material may further include a first minor supportive sheet coupled between a first one of the arm extensions and the first side of the primary supportive sheet. The supportive sheet material may further include a second minor supportive sheet coupled between a second one of the arm extensions and the second side of the primary supportive sheet.

The first workpiece axis and the second workpiece axis may be positioned on opposite sides of a portion of the supportive sheet material. The crossing structure may be arranged to function as the sole or primary source of rotational coupling between the opposite rotary framework ends about the framework axis. The first set of workpiece supports may be arranged to permit rotation of a workpiece about the first workpiece axis and the second set of workpiece supports may be arranged to permit rotation of a workpiece about the second workpiece axis.

The workpiece positioner may comprise a single drive motor and a clutch assembly. The single drive motor and the clutch assembly may be arranged to impart selectively rotary motion to the rotary framework about the framework axis and rotary motion to a workpiece supported by a selected set of workpiece supports. Alternatively, the workpiece positioner may further comprise a pair of drive motors. The first motor of the pair of drive motors may be arranged to impart rotary motion to the rotary framework about the framework axis. The second motor of the pair of drive motors may be arranged to impart rotary motion to a workpiece supported by a selected set of workpiece supports.

Accordingly, it is an object of the present invention to provide an improved workpiece manipulator or positioner. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIG. 2 is a top view of the positioner illustrated in FIG. 1;

FIG. 5 is a front view of a rotary framework portion of a positioner according to one embodiment of the present invention;

FIG. 6 is a top view of the rotary framework illustrated in FIG. 5;

FIG. 7 is a side view of the rotary framework illustrated in FIG. 5; and

DETAILED DESCRIPTION

Figure 1:
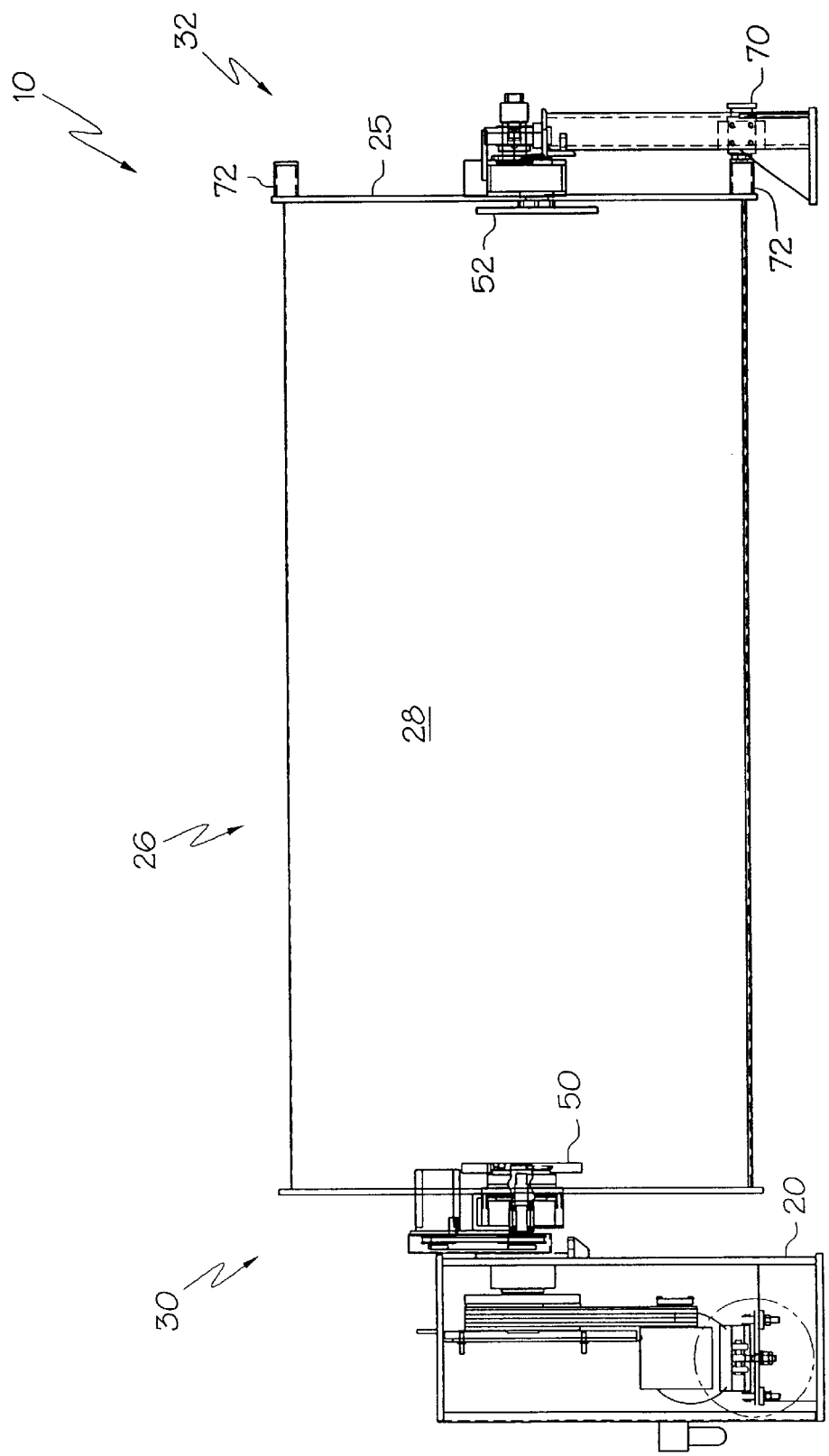
FIG. 1 is a front view of a positioner according to one embodiment of the present invention.
Figures 3, 4:
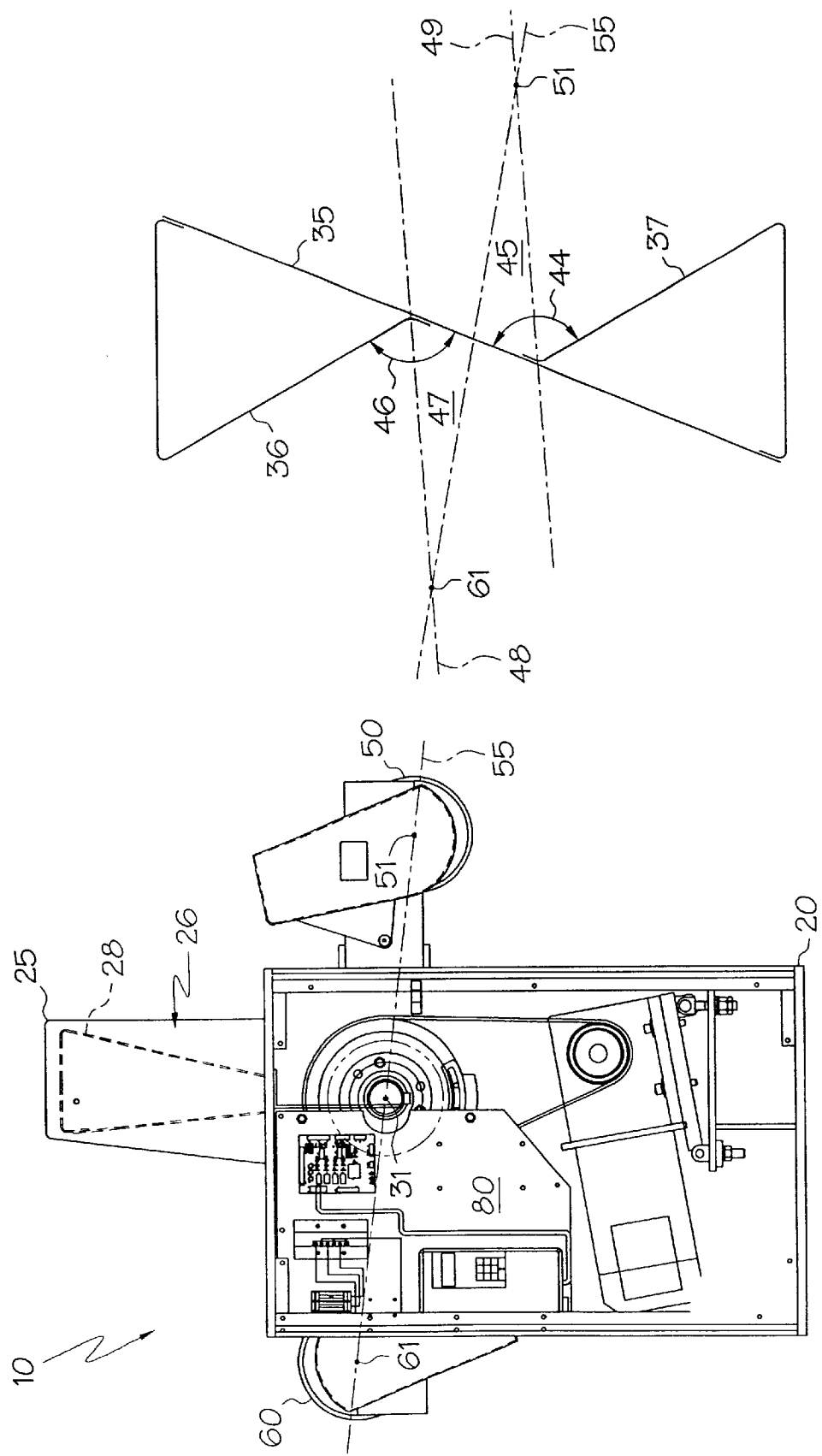
FIG. 3 is a side view of the positioner illustrated in FIG. 1.
FIG. 4 is a schematic illustration of a positioner geometry according to one embodiment of the present invention.

Referring initially to FIGS. 1–3, a workpiece positioner 10 according to the present invention is illustrated. 1. The workpiece positioner 10 comprises a positioner chassis 20, a rotary framework 25, a first set of workpiece supports 50, 52, and a second set of workpiece supports 60, 62. The rotary framework 25 defines opposite rotary framework ends 30, 32 and is coupled to the positioner chassis 20 so as to be rotatable about a longitudinal framework axis 31. A rotation inhibitor or rotary locking assembly 70, is arranged to engage with a frame member 72 so as to inhibit rotation of the rotary framework 25 about the longitudinal framework axis 31 when engaged. Typically, the rotary locking assembly 70 is engaged when a workpiece supported between one of the sets of workpiece supports 50, 52, 60, 62 has been properly positioned and is ready for processing.

The first set of workpiece supports 50, 52 are positioned on opposite ones of the rotary framework ends 30, 32 so as to define a first workpiece axis 51 extending between the first set of workpiece supports 50, 52. The second set of workpiece supports 60, 62 are also positioned on opposite ones of the rotary framework ends 30, 32 and define a second workpiece axis 61 extending between the second set of workpiece supports 60, 62. The first workpiece axis 51 and the second workpiece axis 61 lie in a common workpiece plane 55 (see FIGS. 3, 4, and 6).

Referring additionally to FIGS. 5–7, the rotary framework 25 includes a crossing structure 26 secured to the opposite rotary framework ends 30, 32 and extending along the longitudinal framework axis 31. The crossing structure 26 comprises supportive sheet material 28 arranged so as to be intersected by the common workpiece plane 55. The supportive sheet material 28 is secured between end plates 21, 22 of the rotary framework 25. The crossing structure 26 is identified herein as supportive in that it is arranged to function as the sole or primary source of rotational coupling between the opposite rotary framework ends 30, 32 about the framework axis 31. The crossing structure 26 also functions as a suitable arc shield where workpieces supported between the first and second sets of workpiece supports 50, 52, 60, 62 are processed by arc welding robots.

As is most clearly illustrated in FIG. 6, the transverse cross section of the supportive sheet material 28 converges in the direction of the common workpiece plane 55 so as to optimize the diametrical dimension of the respective rotary envelopes of workpieces supported by the first and second sets of workpiece supports 50, 52, 60, 62. The supportive sheet material of the present invention also minimizes torsional deflection of the rotary framework 25 about the longitudinal framework axis 31. For the purposes of describing and defining the present invention, the transverse cross section is a cross section made at right angles to the longitudinal framework axis 31.

Stated differently, the supportive sheet material 28 defines an X-beam transverse cross section in that the cross section, as illustrated in FIG. 6, for example, includes first and second triangular cross sectional portions 23, 24 collectively resembling an "X." The X-beam transverse cross section may include central apexes 33, 34 that are offset from each other, as is illustrated in FIGS. 5–7. In the embodiment illustrated in FIGS. 1–6, the supportive sheet material 28 includes a primary supportive sheet 35 welded to a pair of minor supportive sheets 36, 37 at weldments 38. The minor supportive sheets 36, 37 include respective elbow portions 39, 40 and arm extensions 41, 42 extending from the elbow portions 39, 40. Each of the arm extensions 41, 42 defines a plane intersecting a plane defined by a substantially planar portion of the primary supportive sheet 35. The supportive sheet material 28 defines a plurality of intersecting supportive planes and a transverse cross section including at least one supportive apex, e.g., central apexes 33, 34.

The primary supportive sheet 35 is disposed between the first and second workpiece axes 51, 61 such that a first side of the primary supportive sheet 35 faces the first workpiece axis 51 and a second side of the primary supportive sheet 35 faces the second workpiece axis 61. The first minor supportive sheet 36 is mechanically coupled to the first side of the primary supportive sheet 35 along a first coupling line 52 parallel to the first workpiece axis 51. The second minor supportive sheet 37 is mechanically coupled to the second side of the primary supportive sheet 35 along a second coupling line 62 parallel to the second workpiece axis 61. The first and second coupling lines 52, 62 are displaced from each other by a selected distance x along a diametrical dimension of the primary supportive sheet 35. For the purposes of describing and defining the present invention, the diametrical dimension is taken along the length of the primary supportive sheet 35 in the direction of the diameter of the circle defined by rotation of the crossing structure 26 about the longitudinal framework axis 31. It is contemplated by the present invention that the magnitude of the distance x may vary from zero to any suitable value above zero.

According to certain embodiments of the present invention, as is illustrated schematically in FIG. 4, the transverse cross section includes a first angle 44 defining a first workpiece accommodating sector 45 and a second angle 46 defining a second workpiece accommodating sector 47. The first workpiece axis 51 is arranged within the first workpiece accommodating sector 45 along a first projection 48 bisecting the first angle 44. The second workpiece axis 61 is arranged within the second workpiece accommodating sector 47 along a second projection 49 bisecting the second angle 46. In this manner, the diametrical dimension of the respective rotary envelopes of workpieces supported by the workpiece supports may be further optimized.

FIGS. 8–13 illustrate some of the alternative arrangements of the supportive sheet material 28 according to the present invention. Specifically, comparing the embodiment of FIG. 8 to the embodiment of FIG. 6, the minor supportive sheets 36, 37 may be arranged such that the central apexes 33, 34 are not offset from each other. Further, the minor supportive sheets 36, 37 may include exaggerated length hand portions 43 extending from the arm extensions 41, 42.

Figure 9:
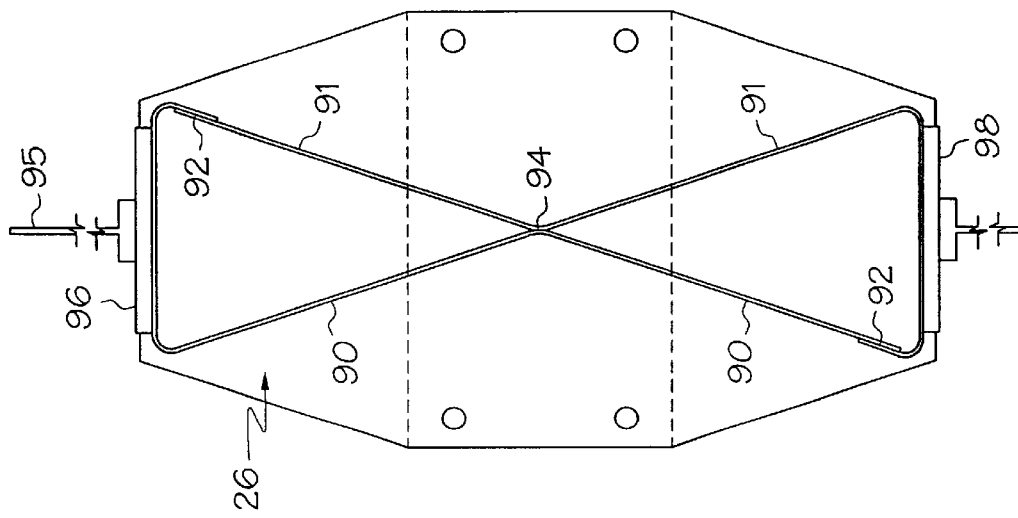
FIGS. 8–13 are illustrations of alternative rotary framework arrangements according to the present invention.
Figure 8:
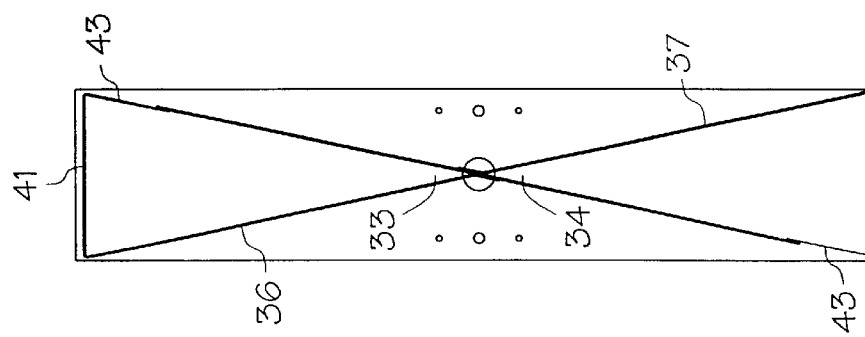

In FIG. 9, the primary sheet 35 and minor sheets 36, 37 of FIG. 6 are replaced with a pair of complementary sheets 90, 91 coupled to each other at end weldments 92 and midpoint weldments 94. The midpoint weldments 94 are formed by successive penetration welds through the sheet material along the longitudinal framework axis 31. In the event the transverse dimension of the crossing structure 26 is not sufficient to function as an arc screen, arc screens 95 may be secured at the top 96 and bottom 98 edges of the crossing structure 26. Similar arc screens may be added to the crossing structures of other embodiments of the present invention as well.

Figure 11:
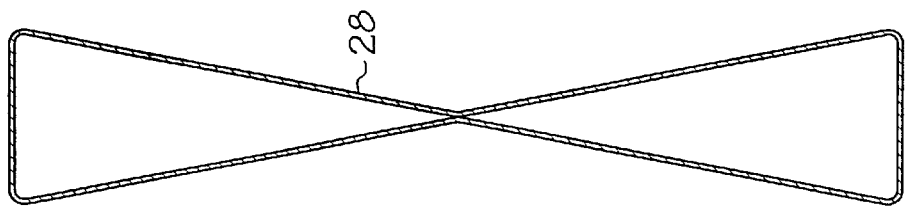
Figure 10:
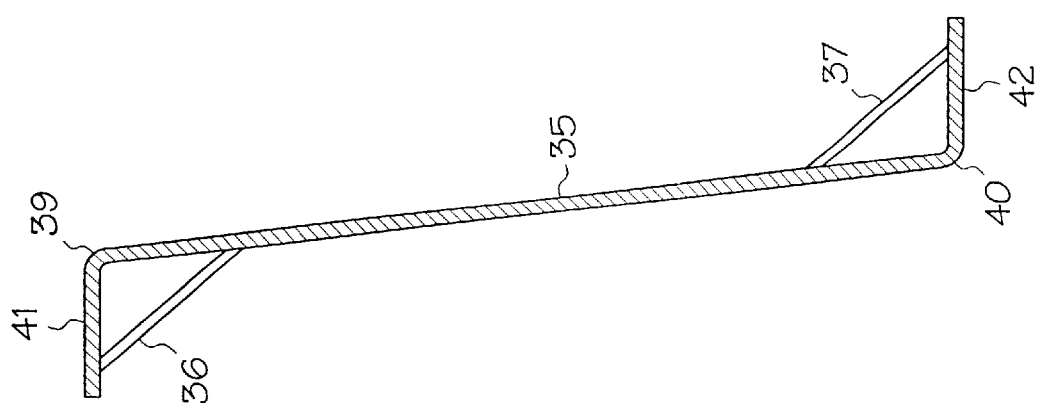
Figure 12:
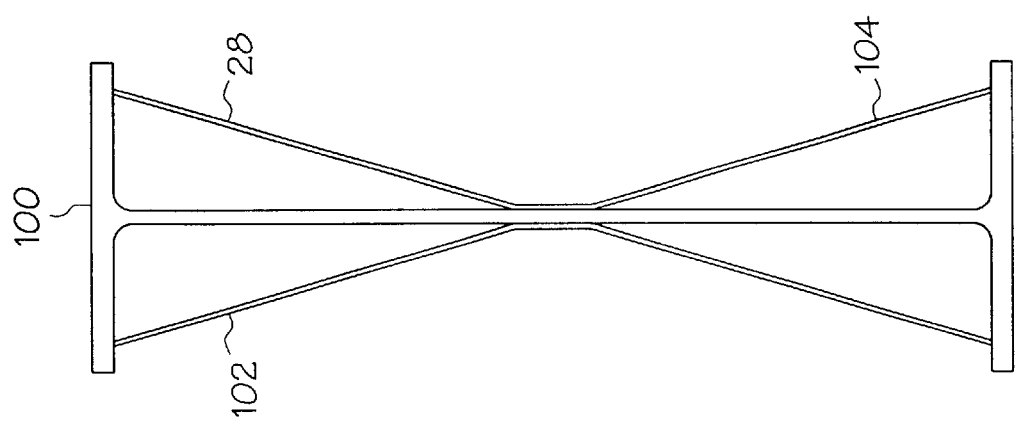
Figure 13:
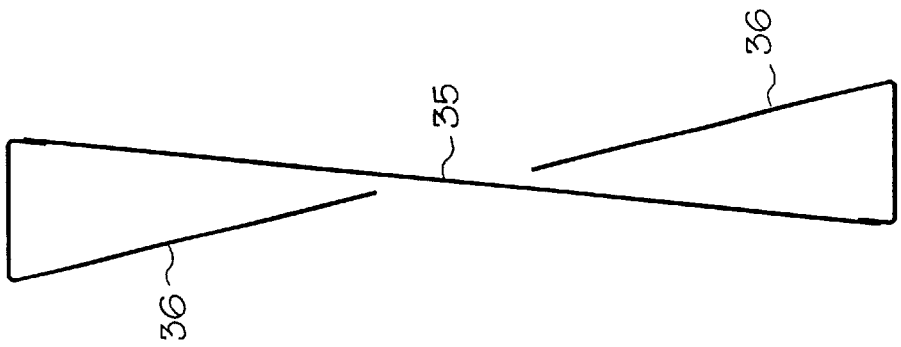

In the embodiment of FIG. 10 the elbows 39, 40 and the arm extensions 41, 42 are included in the primary supportive sheet 35. The minor supportive sheets 36, 37 are coupled between the arm extensions 41, 42 and the corresponding side of the primary supportive sheet 35. In the embodiment of FIG. 11, the supportive sheet material 28 comprises a tubular structure formed into the shape of the readily recognizable X-beam cross section. In the embodiment of FIG. 12, the supportive sheet material 28 comprises a pair of independent supportive sheets 102, 104 secured to an I-beam member 100 arranged in the readily recognizable X-beam layout. In the embodiment of FIG. 13, the minor supportive sheets 36, 37 do not extend to rejoin the primary supportive sheet 35.

The material and dimensional specifications of the supportive sheet material 28 may vary from one application to the next depending upon the specific performance requirements of the particular application. For example, the supportive sheet material may comprise 10 gauge cold rolled steel.

The first set of workpiece supports 50, 52 are arranged to permit rotation of a workpiece about the first workpiece axis 51 and the second set of workpiece supports 60, 62 are arranged to permit rotation of a workpiece about the second workpiece axis 61. A suitable drive motor assembly 80, see FIG. 3, is provided to drive rotation of the rotary framework 25 and workpieces supported by the first and second sets of workpiece supports 50, 52, 60, 62. The specific design of the drive motor assembly 80, and any associated clutches, gears, etc., are beyond the scope of the present invention and may be gleaned from conventional teachings, e.g., U.S. Pat. Nos. 4,666,363, 5,074,741, and 5,873,569, the disclosures of which are incorporated herein by reference. For example, the workpiece positioner 10 may comprise a single drive motor and a clutch assembly arranged to impart selectively rotary motion to the rotary framework 25 about the framework axis 31 and rotary motion to a workpiece supported by a selected set of workpiece supports. Alternatively, the workpiece positioner 10 may comprises a pair of drive motors, the first of which may be arranged to impart rotary motion to the rotary framework 25 about the framework axis 31 and the second of which may be arranged to impart rotary motion to a workpiece supported by a selected set of workpiece supports.

Having described the invention in detail and by reference to preferred embodiments thereof, it will be apparent that modifications and variations are possible without departing from the scope of the invention defined in the appended claims.

What is claimed is:

1. A workpiece positioner comprising:
   a positioner chassis;
   a rotary framework defining opposite rotary framework ends and coupled to said positioner chassis so as to be rotatable about a longitudinal framework axis;
   a first set of workpiece supports positioned on opposite ends of said rotary framework so as to define a first workpiece axis extending between said first set of workpiece supports;
   a second set of workpiece supports positioned on opposite ends of said rotary framework so as to define a second workpiece axis extending between said second set of workpiece supports, wherein said first workpiece axis and said second workpiece axis lie in a common workpiece plane, said rotary framework includes a crossing structure secured to said opposite rotary framework ends and extending along said longitudinal framework axis, said crossing structure comprises supportive sheet material, said supportive sheet material is arranged so as to be intersected by said common workpiece plane, and a transverse cross section of said supportive sheet material converges in the direction of said common workpiece plane.

2. A workpiece positioner as claimed in claim 1 wherein said transverse cross section includes a first angle defining a first workpiece accommodating sector and wherein said first workpiece axis is arranged within said first workpiece accommodating sector along a projection bisecting said first angle.

3. A workpiece positioner as claimed in claim 1 wherein said transverse cross section includes a first angle defining a first workpiece accommodating sector and wherein said first workpiece axis is arranged within said first workpiece accommodating sector along a projection bisecting said first angle.

4. A workpiece positioner as claimed in claim 1 wherein said crossing structure is arranged to function as an arc shield where workpieces supported between said first and second sets of workpiece supports are processed by arc welding robots.

5. A workpiece positioner comprising:

a positioner chassis;

a rotary framework coupled to said positioner chassis so as to be rotatable about a longitudinal framework axis, wherein said rotary framework defines opposite rotary framework ends and includes a crossing structure secured to and extending between said opposite rotary framework ends, said crossing structure comprises supportive sheet material, and said supportive sheet material defines an X-beam transverse cross section;

a first set of workpiece supports positioned on opposite ends of said rotary framework so as to define a first workpiece axis extending between said first set of workpiece supports; and a second set of workpiece supports positioned on opposite ends of said rotary framework so as to define a second workpiece axis extending between said second set of workpiece supports.

6. A workpiece positioner as claimed in claim 5 wherein said supportive sheet material includes offset central apexes.

7. A workpiece positioner as claimed in claim 5 wherein said supportive sheet material includes a primary supportive sheet and a pair of minor supportive sheets.

8. A workpiece positioner as claimed in claim 5 wherein said supportive sheet material includes a pair of elbow portions and respective arm extensions extending from said elbow portions.

9. A workpiece positioner as claimed in claim 5 wherein said transverse cross section includes a first angle defining a first workpiece accommodating sector and wherein said first workpiece axis is arranged within said first workpiece accommodating sector along a projection bisecting said first angle.

10. A workpiece positioner as claimed in claim 5 wherein said transverse cross section includes a second angle defining a second workpiece accommodating sector and wherein said second workpiece axis is arranged within said second workpiece accommodating sector along a projection bisecting said second angle.

11. A workpiece positioner as claimed in claim 5 wherein said crossing structure is arranged to function as an arc shield where workpieces supported between said first and second sets of workpiece supports are processed by arc welding robots.

12. A workpiece positioner comprising:

a positioner chassis;

a rotary framework coupled to said positioner chassis so as to be rotatable about a longitudinal framework axis, wherein said rotary framework defines opposite rotary framework ends and includes a crossing structure secured to and extending between said opposite rotary framework ends, said crossing structure comprises supportive sheet material, said supportive sheet material defines at least two intersecting supportive planes and a transverse cross section including at least one supportive apex;

a first set of workpiece supports positioned on opposite ends of said rotary framework so as to define a first workpiece axis extending between said first set of workpiece supports; and a second set of workpiece supports positioned on opposite ends of said rotary framework so as to define a second workpiece axis extending between said second set of workpiece supports.

13. A workpiece positioner as claimed in claim 12 wherein said transverse cross section includes a first angle defining a first workpiece accommodating sector and wherein said first workpiece axis is arranged within said first workpiece accommodating sector along a projection bisecting said first angle.

14. A workpiece positioner as claimed in claim 12 wherein said transverse cross section includes a second angle defining a second workpiece accommodating sector and wherein said second workpiece axis is arranged within said second workpiece accommodating sector along a projection bisecting said second angle.

15. A workpiece positioner as claimed in claim 12 wherein:

said intersecting supportive planes are defined by a primary supportive sheet, a first minor supportive sheet, and a second minor supportive sheet; and said primary supportive sheet is disposed between said first and second workpiece axes such that a first side of said primary supportive sheet faces said first workpiece axis and a second side of said primary supportive sheet faces said second workpiece axis.

16. A workpiece positioner as claimed in claim 15 wherein:

said first minor supportive sheet is mechanically coupled to said first side of said primary supportive sheet along a first coupling line parallel to said first workpiece axis; and said second minor supportive sheet is mechanically coupled to said second side of said primary supportive sheet along a second coupling line parallel to said second workpiece axis.

17. A workpiece positioner as claimed in claim 16 wherein said first and second coupling lines are displaced from each other along a diametrical dimension of said primary supportive sheet.

18. A workpiece positioner as claimed in claim 15 wherein said first minor supportive sheet includes an elbow portion and an arm extension, and wherein said arm extension is mechanically coupled to said first side of said primary supportive sheet so as to form a first triangular cross sectional portion of said crossing structure.

19. A workpiece positioner as claimed in claim 15 wherein said second minor supportive sheet includes an elbow portion and an arm extension, and wherein said arm extension is mechanically coupled to said second side of said primary supportive sheet so as to form a second triangular cross sectional portion of said crossing structure.

20. A workpiece positioner as claimed in claim 12 wherein:

said supportive sheet material includes a pair of elbow portions, respective arm extensions extending from said elbow portions, and a substantially planar portion defined between said pair of elbow portions; and each of said arm extensions defines a plane intersecting a plane defined by said substantially planar portion.

21. A workpiece positioner as claimed in claim 20 wherein:

said intersecting supportive planes are defined by a primary supportive sheet, a first minor supportive sheet, and a second minor supportive sheet;

said primary supportive sheet is disposed between said first and second workpiece axes such that a first side of said primary supportive sheet faces said first workpiece axis and a second side of said primary supportive sheet faces said second workpiece axis;

said supportive sheet material further includes a first minor supportive sheet coupled between a first one of said arm extensions and said first side of said primary supportive sheet; and said supportive sheet material further includes a second minor supportive sheet coupled between a second one of said arm extensions and said second side of said primary supportive sheet.

22. A workpiece positioner as claimed in claim 12 wherein said first workpiece axis and said second workpiece axis are positioned on opposite sides of a portion of said supportive sheet material.

23. A workpiece positioner as claimed in claim 12 wherein said crossing structure is arranged to function as a primary source of rotational coupling between said opposite rotary framework ends about said framework axis.

24. A workpiece positioner as claimed in claim 12 wherein said crossing structure is arranged to function as a sole source of rotational coupling between said opposite rotary framework ends about said framework axis.

25. A workpiece positioner as claimed in claim 12 wherein said first set of workpiece supports are arranged to permit rotation of a workpiece about said first workpiece axis and wherein said second set of workpiece supports are arranged to permit rotation of a workpiece about said second workpiece axis.

26. A workpiece positioner as claimed in claim 12 wherein said workpiece positioner further comprises a single drive motor and a clutch assembly, and wherein said single drive motor and said clutch assembly are arranged to impart selectively rotary motion to said rotary framework about said framework axis and rotary motion to a workpiece supported by a selected set of workpiece supports.

27. A workpiece positioner as claimed in claim 12 wherein said workpiece positioner further comprises a pair of drive motors, wherein a first motor of said pair of drive motors is arranged to impart rotary motion to said rotary framework about said framework axis, and wherein a second motor of said pair of drive motors is arranged to impart rotary motion to a workpiece supported by a selected set of workpiece supports.

28. A workpiece positioner as claimed in claim 12 wherein said crossing structure is arranged to function as an arc shield where workpieces supported between said first and second sets of workpiece supports are processed by arc welding robots.

* * * * *